United States Patent
Bamba (10) Patent No.: US 10,740,652 B2
(45) Date of Patent: Aug. 11, 2020

(54) IMAGE PROCESSING APPARATUS, IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Yasuo Bamba, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 243 days.

(21) Appl. No.: 15/907,699

(22) Filed: Feb. 28, 2018

(65) Prior Publication Data

US 2018/0253629 A1 Sep. 6, 2018

(30) Foreign Application Priority Data

Mar. 3, 2017 (JP) .................................. 2017-040921

(51) Int. Cl.

| | |
|---|---|
| *G06K 9/62* | (2006.01) |
| *G06K 9/00* | (2006.01) |
| *G06K 9/46* | (2006.01) |
| *G06T 7/11* | (2017.01) |
| *G06T 11/60* | (2006.01) |
| *G06T 7/73* | (2017.01) |
| *G06K 9/20* | (2006.01) |
| *G06T 15/20* | (2011.01) |

(52) U.S. Cl.
CPC ....... *G06K 9/6257* (2013.01); *G06K 9/00362* (2013.01); *G06K 9/00778* (2013.01); *G06K 9/2054* (2013.01); *G06K 9/4638* (2013.01); *G06T 7/11* (2017.01); *G06T 7/73* (2017.01); *G06T 11/60* (2013.01); *G06T 15/20* (2013.01); *G06T 2207/20081* (2013.01); *G06T 2207/30196* (2013.01); *G06T 2207/30242* (2013.01)

(58) Field of Classification Search
CPC .... G06F 16/532; G06F 16/58; G06F 16/5838; G06K 2209/01; G06K 2209/15
USPC ....... 382/159, 117, 118, 128, 181, 191, 195, 382/201, 205, 209, 219, 278, 282; 707/749; 704/236
See application file for complete search history.

(56) References Cited

U.S. PATENT DOCUMENTS 8,406,525 B2 *  3/2013  Ma ..................... G06K 9/00275
                                                 382/159

OTHER PUBLICATIONS

Lempitsky et al. "Learning to Count Objects in Images" 2010:1-9. Cited in the Specification.

(Continued)

*Primary Examiner* — Charlotte M Baker
(74) *Attorney, Agent, or Firm* — Rossi, Kimms & McDowell LLP (57) ABSTRACT

There is provided with an image processing apparatus, for example for image recognition such as object counting with machine learning. A generation unit, based on a first captured image, generates a first training data that indicates a first training image and an image recognition result for the first training image. A training unit, by performing training using the first training data, generates a discriminator for image recognition based on both the first training data and second training data that is prepared in advance and that indicates a second training image and an image recognition result for the second training image.

17 Claims, 7 Drawing Sheets

(56) References Cited

OTHER PUBLICATIONS

Ikeda et al. "Accuracy Improvement of People Counting Based on Crowd-Patch Learning Using Convolutional Neural Network" FIT 2014, 13th Information Science and Technology Forum, Jul. 8, 2014: 105-106. Cited in the Specification.

* cited by examiner

ELAPSED TIME: 0:10:35

NUMBER OF ADDITIONAL TRAINING DATA ITEMS: 1218 IMAGES

ERROR: 0.02

TRAINING PROGRESS IS 86%
END INCREMENTAL TRAINING MODE?

YES　　NO

IMAGE PROCESSING APPARATUS, IMAGE PROCESSING SYSTEM, IMAGE PROCESSING METHOD, AND STORAGE MEDIUM

BACKGROUND OF THE INVENTION

Field of the Invention

The present invention relates to an image processing apparatus, an image processing system, an image processing method, and a storage medium.

Description of the Related Art

In recent years, systems in which by capturing a predetermined region with an image capturing apparatus, and performing image recognition on the captured image, information such as the number of people in the image or the existence or absence of an abnormality is obtained have been proposed. Such systems can detect a congestion in a public space and can be used grasp a flow of people at a time of congestion, and therefore are expected to be applicable in congestion alleviation at events and evacuation guidance in times of crisis.

As a method of such image recognition, a method in which a recognition model is generated by machine training using supervisory data that is prepared in advance, and image recognition is performed by using the obtained recognition model has been proposed. For example, as a method of estimating a number of people that uses machine training there is a method in which a recognition model is trained based on a known machine training process such as a support vector machine or deep learning by using images for which the number of people is known as training data. A concrete example is Lempitsky (V. Lempitsky et al. "Learning to Count Objects in Images", Advances in Neural Information Processing Systems (NIPS), 2010), in which machine training of a density map estimator that estimates a density map of a target object is performed. Then, a density map for a recognition target image is generated using a density map estimator after training, and the number of target objects is estimated by taking an integral of the density map. In addition, in Ikeda (Hiroo Ikeda et al., "Accuracy Improvement of People Counting Based on Crowd-Patch Learning Using Convolutional Neural Network", FIT 2014, 13th Information Science and Technology Forum, 2014), machine training of a regressor that uses fixed size small images as input and outputs the number of people in the small images is performed. Then, after dividing the recognition target image into sub-regions, each sub-region is resized into a fixed size to generate a small image, and the number of people in each small image is obtained by the regressor after training, and by obtaining a sum of the obtained numbers of people of each small image, the number of people in the recognition target image is estimated.

SUMMARY OF THE INVENTION

According to an embodiment of the present invention, an image processing apparatus comprises a generation unit configured to, based on a first captured image, generate a first training data that indicates a first training image and an image recognition result for the first training image; and a training unit configured to, by performing training using the first training data, generate a discriminator for image recognition based on both the first training data and second training data that is prepared in advance and that indicates a second training image and an image recognition result for the second training image.

According to another embodiment of the present invention, an image processing apparatus comprises: a training unit configured to generate a discriminator that is based on both first training data indicating a first training image that is based on a first captured image obtained by a first image capturing apparatus and an image recognition result of the first training image, and second training data indicating a second training image that is based on a second captured image obtained by a second image capturing apparatus that is different to the first image capturing apparatus and an image recognition result of the second training image, wherein the discriminator is a discriminator for image recognition on an image captured by the first image capturing apparatus.

According to still another embodiment of the present invention, an image processing system comprises: a generation unit configured to, based on a first captured image, generate a first training data that indicates a first training image and an image recognition result for the first training image; and a training unit configured to, by performing training using the first training data, generate a discriminator for image recognition based on both the first training data and second training data that is prepared in advance and that indicates a second training image and an image recognition result for the second training image.

According to still yet another embodiment of the present invention, an image processing method comprises: based on a first captured image, generating a first training data that indicates a first training image and an image recognition result for the first training image; and by performing training using the first training data, generating a discriminator for image recognition based on both the first training data and second training data that is prepared in advance and that indicates a second training image and an image recognition result for the second training image.

According to yet still another embodiment of the present invention, a non-transitory storage medium stores a program which, when executed by a computer comprising a processor and a memory, causes the computer to: based on a first captured image, generate a first training data that indicates a first training image and an image recognition result for the first training image; and by performing training using the first training data, generate a discriminator for image recognition based on both the first training data and second training data that is prepared in advance and that indicates a second training image and an image recognition result for the second training image.

Further features of the present invention will become apparent from the following description of exemplary embodiments (with reference to the attached drawings).

DESCRIPTION OF THE EMBODIMENTS

When, for example, a capturing time, a direction of an image capturing apparatus, a position of the image capturing apparatus, an angle of view of the image capturing apparatus, a space in which the image capturing apparatus is arranged, or the like changes, tendencies of images obtained by the image capturing apparatus also change. Also, in cases where the tendencies of the images obtained by the image capturing apparatus are different from the tendencies of images used in the training of a recognition model, the accuracy of obtained image recognition results may decrease.

An embodiment of the present invention improves accuracy of image recognition processing when performing image recognition processing on captured images obtained by an image capturing apparatus arranged in a predetermined environment by using machine training.

Hereinafter, embodiments of the present invention are described based on the drawings. However, the scope of the present invention is not limited to the embodiments below.

Some embodiments described hereinafter use a discriminator for image recognition that is trained in advance by using supervisory data prepared in advance, in other words, training data indicating a training image and a correct result of image recognition of the training image. Also, this incremental training of the discriminator is performed by using additional training data indicating a training image generated from a captured image captured in a specific scene and an image recognition result of the training image. For example, an update of parameters of the discriminator is performed by incremental training. By such training, a discriminator that is based on both supervisory data and additional training data is generated. Also, by performing such incremental training, it is possible to cause recognition accuracy by a discriminator to improve when performing image recognition on a captured image captured in a specific scene.

Also, it is possible to use an image recognition result of a training image that is automatically obtained, when generating additional training data as described hereinafter. In other words, it is possible to generate additional training data by using an image recognition result that is automatically obtained by using a method that is different from a recognition method that uses a discriminator for which training is performed. According to such a configuration, since additional training data can be generated without a user inputting correct recognition results, it is possible to reduce the burden on the user.

Hereinafter, description regarding an application for recognizing a number of counting targets appearing within a captured image is given. In other words, a discriminator for estimating the number of counting targets within an image is used as the discriminator. Also, an image recognition result of a training image included in supervisory data is a number of counting targets within the training image, and an image recognition result of a training image included in additional training data is also the number of counting targets within the training image. Hereinafter, in particular, estimation of a number of humans within an image is performed. However, it is possible to perform estimation of a number of counting targets other than humans.

Meanwhile, the application of the present invention is not limited to cases in which a number of counting targets captured within an image is recognized. Actually, the present invention can also be adopted to cases where other types of image recognition is performed. For example, the present invention can be adopted to cases where an outline of an object is detected from an image or in cases where character recognition is performed on an image.

Figure 1:
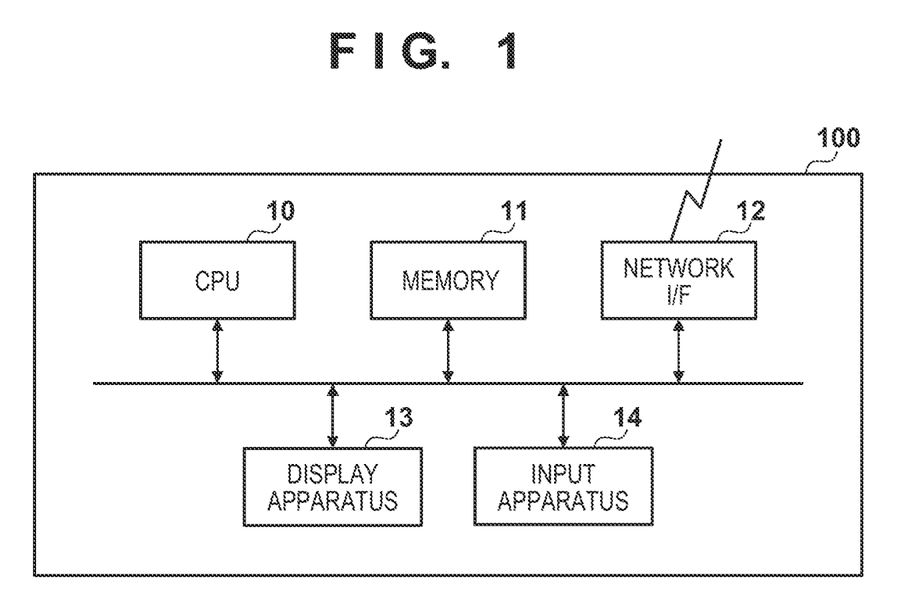
FIG. 1 is a view illustrating an example of a hardware configuration of an image processing apparatus according to an embodiment.

FIG. 1 is a view illustrating an example of a hardware configuration of an image processing apparatus 100 according to a first embodiment. The image processing apparatus 100 includes a CPU 10, a memory 11, a network I/F 12, a display apparatus 13, and an input apparatus 14 as a hardware configuration. The CPU 10 manages control of the image processing apparatus 100 overall. The memory 11 stores data, programs, and the like that the CPU 10 uses for processing. The network I/F 12 is an interface for connecting the image processing apparatus 100 to a network. The display apparatus 13 is an apparatus for displaying images and can, for example, display results of processing by the CPU 10 and the like on a liquid crystal display apparatus or the like. The input apparatus 14 is an apparatus for receiving input based on operations of the user and is, for example, a mouse, buttons, or the like. By the CPU 10 executing processes based on programs stored in the memory 11, a functional configuration of the image processing apparatus 100 illustrated in FIG. 2 and the process of the flowchart illustrated in FIG. 3 can be realized.

Figure 2:
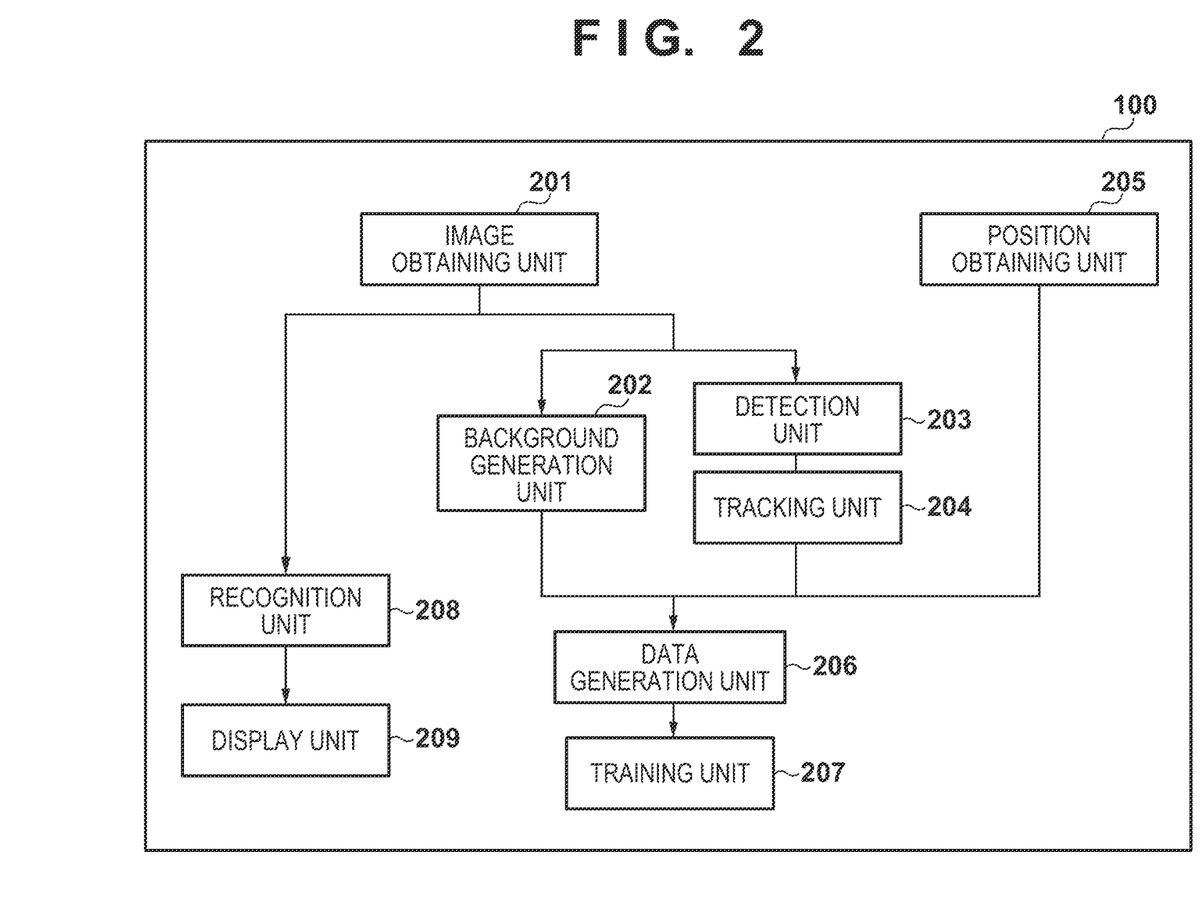
FIG. 2 is a view illustrating an example of a functional configuration of the image processing apparatus according to the embodiment.

FIG. 2 illustrates an example of the functional configuration of the image processing apparatus 100. The image processing apparatus 100 includes an image obtaining unit 201, a data generation unit 206, a training unit 207, a recognition unit 208, and a display unit 209 as a functional configuration. Also, although the image processing apparatus 100 further includes a background generation unit 202, a detection unit 203, a tracking unit 204, and a position obtaining unit 205, it is not necessary to include each of these units as described later. Note, these functional configurations may be distributed in a plurality of apparatuses. In other words, a plurality of apparatuses that an image processing system comprises may have one or more of these functional configurations respectively. It is possible to realize the function of the image processing apparatus 100 even by these apparatuses that the image processing system comprises operating while communicating each other via a network.

The image obtaining unit 201 obtains an image using incremental training. By using this image, the data generation unit 206 generates additional training data as described later. Also, the image obtaining unit 201 obtains an image targeted for estimating a number of people. The recognition unit 208 performs processing for estimating the number of people in relation to this image.

As described above, the image used in incremental training is an image captured in the same scene (or capturing conditions) as the image targeted for estimating the number of people. An image captured in the same scene means an image captured by using the same image capturing apparatus, an image captured in the same capturing time period, an image in which the distance and angle in relation to the ground is captured in the same state, an image captured at the same position, an image captured with the same angle of view, or an image captured in the same space. In this way, the tendencies of the images are more similar for images captured in the same scene compared to images captured in another scene. Accordingly, by using, as an image to be used in incremental training, an image captured in the same scene as an image targeted for estimating a number of people, it is possible to cause the accuracy of image recognition in that scene to increase.

In one embodiment, an image obtained by the image obtaining unit 201 is a captured image obtained by the same image capturing apparatus. In other words, an image used in incremental training and an image targeted for estimating a number of people are captured images obtained by the same image capturing apparatus. In such an embodiment, training of a discriminator is performed by using a training image that is based on a captured image obtained by the image capturing apparatus and additional training data indicating an image recognition result of the training image. Meanwhile, supervisory data prepared in advance may be training data for generating a general-purpose discriminator that can be used in a wide range of scenes. Such supervisory data indicates training images that are based on images captured in various scenes and image recognition results of the training images. Accordingly, in one embodiment, the supervisory data includes training images that are based on captured images that are obtained by an image capturing apparatus that is different to the image capturing apparatus that captured an image to be used to generate additional training data and an image analysis result for the training image. As described later, the training unit 207 can generate a discriminator based on both the additional training data and the supervisory data. The discriminator obtained by such processing will have a higher image recognition accuracy with respect to an image captured by the image capturing apparatus which captured the images used for generating the additional training data than a discriminator by which training is performed by using only supervisory data. In this way, by virtue of these processes, a discriminator for image analysis on captured images obtained by the image capturing apparatus can be generated. Such a configuration can cause the accuracy of image recognition processing to particularly increase in a case where both an image used in incremental training and an image targeted for estimating a number of people are captured by an image capturing apparatus such as monitoring camera which is maintained so as to have a certain position and orientation.

The image processing apparatus 100 may be an image capturing apparatus. In such a case, the image obtaining unit 201 may obtain an image from a solid-state image sensor such as a CMOS sensor or a CCD sensor that the image processing apparatus 100 is equipped with, and may obtain an image from a storage apparatus such as a hard disk. Meanwhile, the image processing apparatus 100 may also be an apparatus that is separate from the image capturing apparatus. In such a case, the image obtaining unit 201 may obtain an image from the image capturing apparatus via a network and may obtain an image stored in a storage apparatus that the image processing apparatus 100 is equipped with or that exists on a network.

The background generation unit 202 generates a background image of an image to be used for incremental training that the image obtaining unit 201 obtained. By using this background image, the data generation unit 206 can generate additional training data.

The detection unit 203, by performing a counting target detection process on an image to be used for the incremental training that the image obtaining unit 201 obtained, generates position information of a counting target within this image. In such a case, the data generation unit 206 extracts a training image from the image used for the incremental training that the image obtaining unit 201 obtained and determines the number of counting targets within the training image by using the position information of the counting targets within the image used for the incremental training. In this way, the data generation unit 206 generates additional training data indicating a training image and the number of counting targets.

In the present embodiment, the detection unit 203 obtains a human detection result by performing human detection on an image. The detection unit 203 can perform the human detection by using a known pattern recognition technique, a recognition technique that uses machine training, or the like. Here, human detection refers to processing for specifying the position of at least a part of a human body from within an image, and for example, refers to processing for specifying the position of a body part of a human body defined in advance, such as the head, the face, a hand, or the like of a person. In the present embodiment, the detection unit 203 detects the position of the head of a person by using a human detector which detects the head position of a person. A human detection result is represented as a figure of an arbitrary shape (such as a rectangle or an ellipse) on the image.

The tracking unit 204 obtains a tracking result of a human. For example, the tracking unit 204 performs association processing between images of detected human bodies by using the human detection result obtained by the detection unit 203 performing processing on each image captured consecutively temporally. Association processing can be performed in accordance with a conventional technique. For example, this process can be formulated as a matching problem for pairing human detection results corresponding to the same human from among the human detection results from each image. Specifically, it is possible to first define a similarity between humans detected from differing images based on a feature amount such as the position or size of a shape representing a human, an image feature amount extracted from an image corresponding to a human, or the like. Also, by pairing combinations of humans with a high similarity, associations can be made. As a specific association method, it is possible to use a method in which pairs are created in order from a group of humans having a highest level of similarity or an overall optimization method in which pairs are created such that the sum of overall similarity becomes the highest. The tracking unit 204 applies identical IDs to associated human detection results. In this way, a group of human detection results indicated by the same ID are obtained as a human tracking result. A human tracking result corresponds to the path of a human detected by the detection unit 203. In the present embodiment, the data generation unit 206 generates density information of counting targets within an image to be used for incremental training by using tracking results according to the tracking unit 204. Then, the data generation unit 206 extracts a training image from the image used for the incremental training in accordance with the density information.

The position obtaining unit 205 obtains positional information of counting targets within the image used for the incremental training that the image obtaining unit 201 obtained. In the present embodiment, the position obtaining unit 205 obtains position information of humans from an external apparatus. The external apparatus is an apparatus for measuring position information of humans. A position obtaining device or the like that uses a frequency band called ultra-wideband is present as an example of the external apparatus. By people carrying such an external apparatus, it becomes possible to obtain three-dimensional position information of the people with high accuracy. Also, the position obtaining unit 205 can convert the position information of humans obtained from the external apparatuses to position information in the image that the image obtaining unit 201 obtained. For example, the position obtaining unit 205, by obtaining beforehand parameters for converting a three-dimensional position represented in a world coordinate system into a position represented in a camera coordinate system, can convert the three-dimensional position of a human into a two-dimensional position on an image.

The data generation unit 206 generates additional training data indicating a training image and an image recognition result of the training image, based on an image to be used in incremental training that the image obtaining unit 201 obtained. In the present embodiment, the data generation unit 206 generates the additional training data by using results obtained by at least one out of the background generation unit 202, the detection unit 203, and the position obtaining unit 205. Also, the data generation unit 206 can further consider the results obtained by the tracking unit 204 when generating the additional training data. Also, the data generation unit 206 can generate the additional training data according to various methods, and combine these to provide output to the training unit 207. Detailed processing of the data generation unit 206 is described later with reference to the flowcharts of FIGS. 4 and 5.

Meanwhile, the method of generating additional training data is not limited to a method using the background generation unit 202, the detection unit 203, or the position obtaining unit 205. In other words, the data generation unit 206 can obtain image recognition results of a training image by any method to generate additional training data. In one embodiment, the data generation unit 206 automatically generates an image recognition result of a training image without obtaining an input of the user. Furthermore, the data generation unit 206 may obtain additional training data from an external apparatus. For example, the image processing apparatus 100 can obtain additional training data that a connected image capturing apparatus generated, and can obtain additional training data generated on an external apparatus or on a cloud in accordance with an image captured by the image capturing apparatus.

The training unit 207 performs an update of the recognition unit 208 by using the additional training data that the data generation unit 206 generated. By such incremental training, the training unit 207 can update the recognition unit 208 so as to generate a discriminator for which training is performed by using both additional training data and supervisory data that is prepared in advance. It is possible to employ any known method as a specific training method in accordance with the recognition model of a discriminator that the recognition unit 208 uses.

The recognition unit 208 performs image analysis by using a discriminator obtained by incremental training by the training unit 207. In the present embodiment, the recognition unit 208 estimates a number of humans in an image targeted for estimating a number of people that the image obtaining unit 201 obtained.

The display unit 209 causes the display apparatus 13 to display the number of humans estimated by the recognition unit 208.

Figure 3:
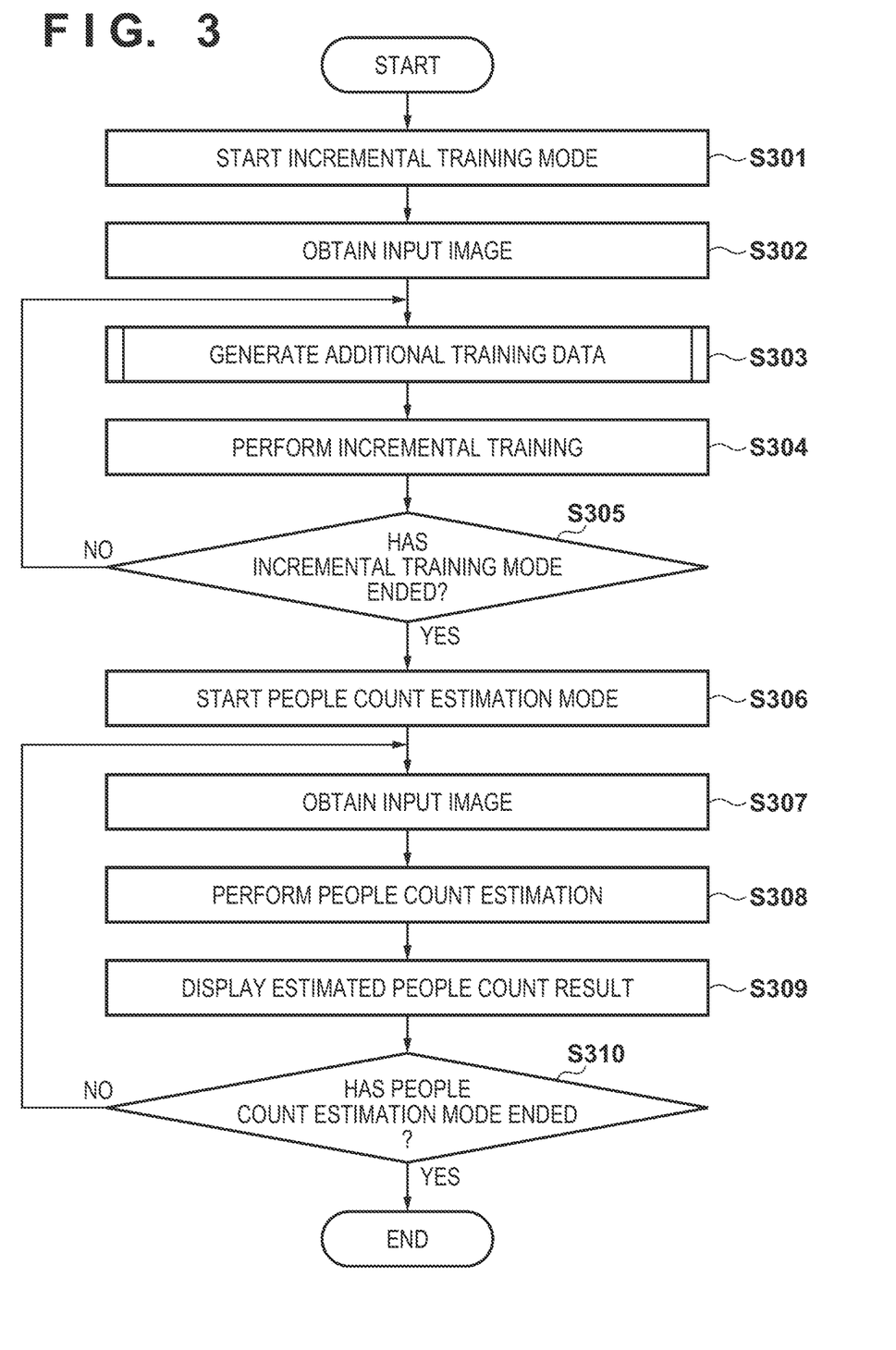
FIG. 3 is a flowchart illustrating an example of image processing according to the embodiment.

FIG. 3 is a flowchart illustrating an example of image processing by the image processing apparatus 100. In step S301, the image processing apparatus 100 starts an incremental training mode. The incremental training mode is a mode in which additional training data is generated and incremental training of the recognition unit 208 which used the additional training data is performed.

In step S302, the image obtaining unit 201 obtains an image to be used for incremental training.

In step S303, the data generation unit 206 generates additional training data for the incremental training of the recognition unit 208. Details are described below.

In step S304, the training unit 207 updates the parameters of the recognition model that the recognition unit 208 holds by using the additional training data that the data generation unit 206 generated. In the present embodiment, the recognition unit 208 performs image recognition by using a recognition model based on a deep neural network. In such a case, in step S304, with parameters of the recognition model prior to the start of step S301 as initial values, the parameters of the recognition model are updated by using the additional training data. It is possible to use a known method such as an inverse error propagation method for update of the parameters. At this time, configuration may be taken to employ a configuration in which such that only parameters of a predetermined hierarchical layer, from among respective hierarchical levels of the deep neural network, are updated.

In step S304, it is possible to perform incremental training by using only the additional training data generated in step S303. However, in step S304, it is also possible to perform incremental training by using other training data in addition to the additional training data. For example, incremental training of the recognition unit 208 may be performed by using mixed training data in which supervisory data used for training of the recognition unit 208 before incremental training and the additional training data generated in step S303 are mixed. By virtue of such a configuration, the chance of over-training of the recognition unit 208 may be decreased, and it will be possible to improve the accuracy of the estimation of the number of people.

At this time, it is possible to mix supervisory data and additional training data so that a distribution of labels in the training data does not vary. For example, in a case where a predetermined number of training data items having a particular label are mixed with supervisory data as additional training data, it is possible to exclude the same number of training data items having the same label from the supervisory data. In the case of the present embodiment, a label refers to a number of humans within a training image. In the present embodiment, because a training image is selected in accordance with density information, training data for a case where the number of humans is small tends to be added as additional training data. When performing training by simply mixing such additional training data with supervisory data, it may be biased in the direction where the recognition result of the number of humans by the discriminator becomes smaller. However, it is possible to decrease the bias of the recognition result by excluding training data from supervisory data so that a distribution of the numbers of humans in the training data does not deteriorate.

The processes of step S303 and step S304 can be repeated. In other words, the data generation unit can repeat generation of additional training data, and the training unit 207 can repeat training using the additional training data. In step S305, the training unit 207 determines whether or not repeating of this training has ended, and specifically decides whether or not the incremental training mode has ended.

The condition for ending the incremental training mode is not particularly limited. For example, the training unit 207 may end the incremental training mode based on at least one of a period at which training is repeated, a training repetition count, and a discrimination accuracy of the discriminator for which the training was performed. As a concrete example, the training unit 207 can end the incremental training mode in a case where one or more of the following (1) to (4) are satisfied.

(1) A predetermined time has elapsed from when the incremental training mode is started.

(2) A predetermined amount of additional training data has been accumulated.

(3) An error of the recognition unit 208 after incremental training is performed by using additional training data is less than or equal to a predetermined value. For example, it is possible to perform incremental training by using only data for training by dividing the generated additional training data into data for training and data for evaluation at a predetermined ratio. Then, in the case where an estimation error according to the recognition unit 208 is calculated using the data for evaluation, and the estimation error is less than or equal to a predetermined target value, it can be determined that a sufficient discrimination accuracy has been attained.

Figure 6:
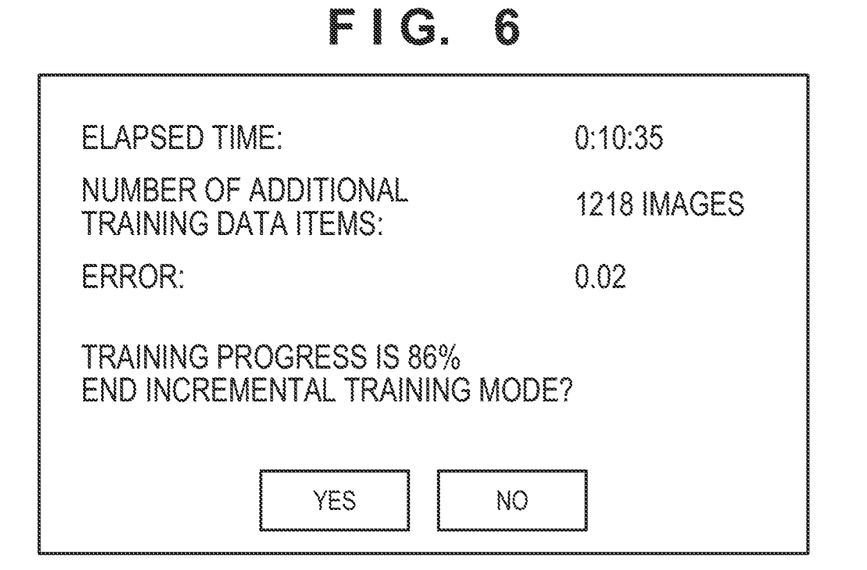
FIG. 6 is a view illustrating an example of a UI displayed in an incremental training mode.

(4) The user performing an instruction to explicitly cause the incremental training mode to end. For example, the display unit 209 can query the user as to whether or not to end the incremental training mode by causing the display apparatus 13 to display a dialog box such as is illustrated in FIG. 6. In such a case, as illustrated in FIG. 6, the time that has elapsed since the start of the incremental training mode, the number of additional training data items, and a number such as the estimation error according to the recognition unit 208 may be presented to the user. Also, the display unit 209 may present to the user the training progress in relation to a target. The progress of the training can be obtained by (E1−e)/(E1−E2) where the current estimation error according to the recognition unit 208 is e. Here, E1 is the estimation error according to the recognition unit 208 prior to performing incremental training of the recognition unit 208, and E2 is a target value of the estimation error.

In step S306, the image processing apparatus 100 starts a people count estimation mode. The people count estimation mode is a mode in which the number of people in an image obtained by the image obtaining unit 201 is estimated by using the recognition unit 208.

In step S307, the image obtaining unit 201 obtains an image targeted for estimating a number of people.

In step S308, the recognition unit 208, after the incremental training is performed, performs an estimation of the number of people, targeting the image that the image obtaining unit 201 obtained in step S307. In the estimation of the number of people, it is possible to use any method that is based on a recognition model to be used. For example, in the case of using a density map estimator, the number of people can be estimated by obtaining a density map for the image, and taking an integral of the density map. Also, in the case of using a regressor, it is possible to divide an image into sub-regions, and then generate small images by resizing the sub-regions to a fixed size, and then obtain a regression value by the regressor indicating the number of people in each small image. A sum of the obtained numbers of people is an estimated value of the number of people in the image.

The size of the sub-regions may be fixed, or there may be different sizes in accordance with the position on the image. For example, it is possible to make a ratio between the size of the sub-regions and the size of a human on the image be substantially fixed. The size of a human on the image may be inputted explicitly by a user using an input apparatus such as a mouse. For example, by a user inputting the average size of a human in a plurality of locations on an image, the recognition unit 208 is enabled to estimate by interpolation the average size of a human at any point on the image. Also, the size of a human on an image can be automatically estimated by statistical processing. When the size of a human is s at coordinates (x, y) on the image, it is possible to assume that s will be represented by x, y, and one or more unknown parameters. For example, it can be assumed that s=ax+by+c. In this example, the unknown parameters are a, b, and c. The recognition unit 208 can obtain the unknown parameters by statistical processing such as a least-squares method, for example, by using a set of human detection results that the detection unit 203 detected.

In step S309, the display unit 209 causes the display apparatus 13 to display the estimated number of people result obtained by the recognition unit 208. The display unit 209 can cause the display apparatus 13 to display a result of estimating the number of people appearing in the whole image obtained in step S306.

Figure 10:
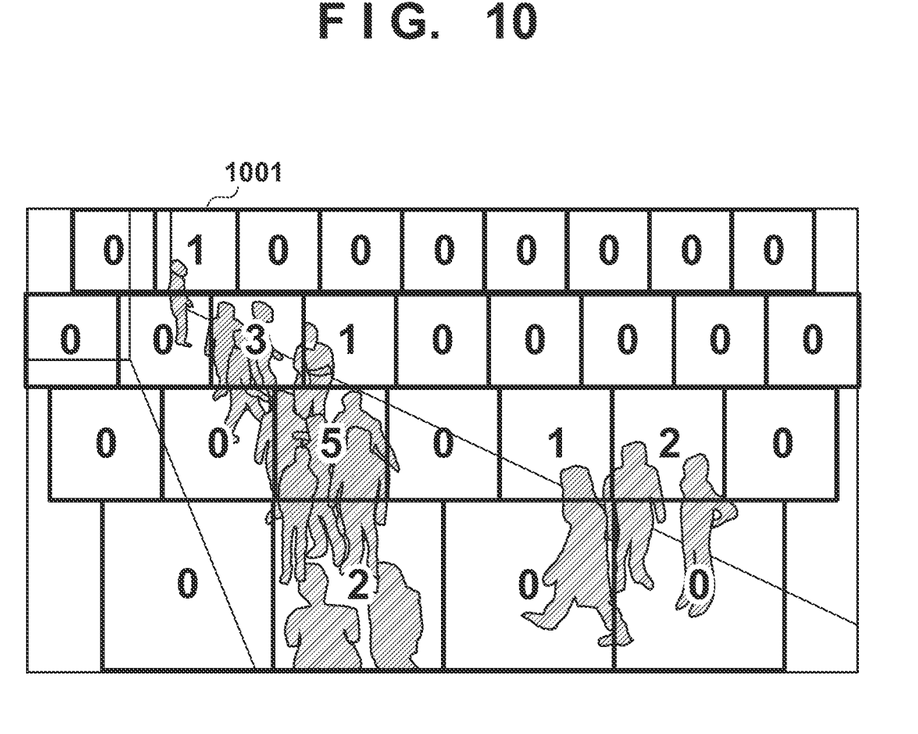
FIG. 10 is a view illustrating an example of a display method.

Also, the display unit 209 may perform a more detailed display so that the estimated number of people can be known for each position in the image. For example, the display apparatus 13 can display the image obtained in step S306, information indicating the positions of sub-regions in the image, and the numbers of humans appearing in a sub-region. As a concrete example, the display apparatus 13 can display the estimated number of people for each sub-region. FIG. 10 illustrates such an example. In the example of FIG. 10, the estimated number of people in a sub-region 1001 obtained in step S308 is one person, and this number is displayed to overlap the sub-region 1001. Also, it is possible to perform image processing that differs in accordance with the estimated number of people on a sub-region. For example, the display apparatus 13 can perform a display such that a region become redder the higher the estimated number of people is for that region. Also, in the case of estimating the number of people by generating a density map in step S308, it is possible to apply image processing that differs in accordance with the pixel values of the density map to an image. For example, the display apparatus 13 can display a pixel to be redder the larger the respective density indicated in the density map is.

In step S310, the recognition unit 208 decides whether or not to end the people count estimation mode. For example, the recognition unit 208 may end the people count estimation mode when the user explicitly inputs an instruction to cause the people count estimation mode to end. In the case of not ending the people count estimation mode, step S307 is returned to and the processing for estimating the number of people is repeated.

Figure 4:
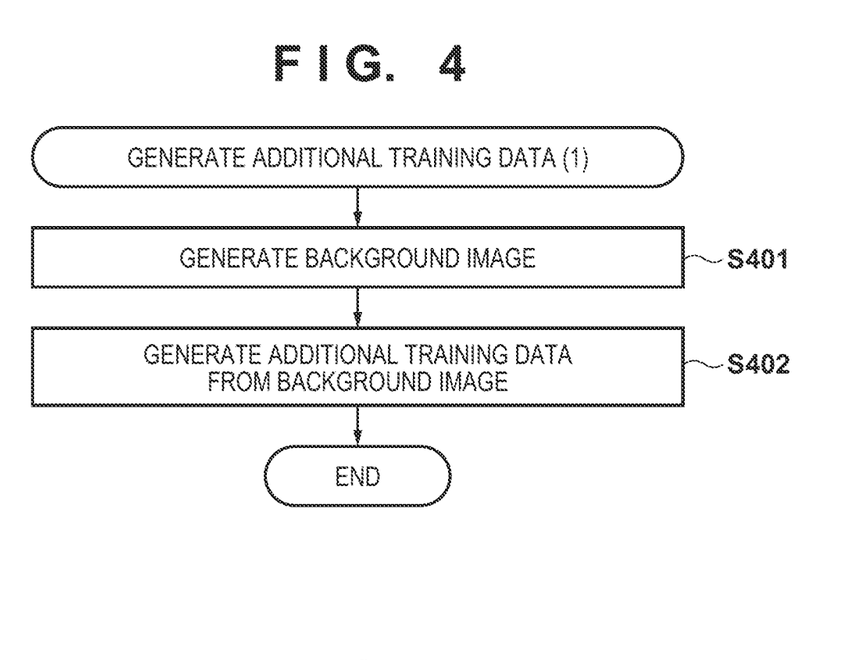
FIG. 4 is a flowchart illustrating an example of a method of generating additional training data.
Figure 5:
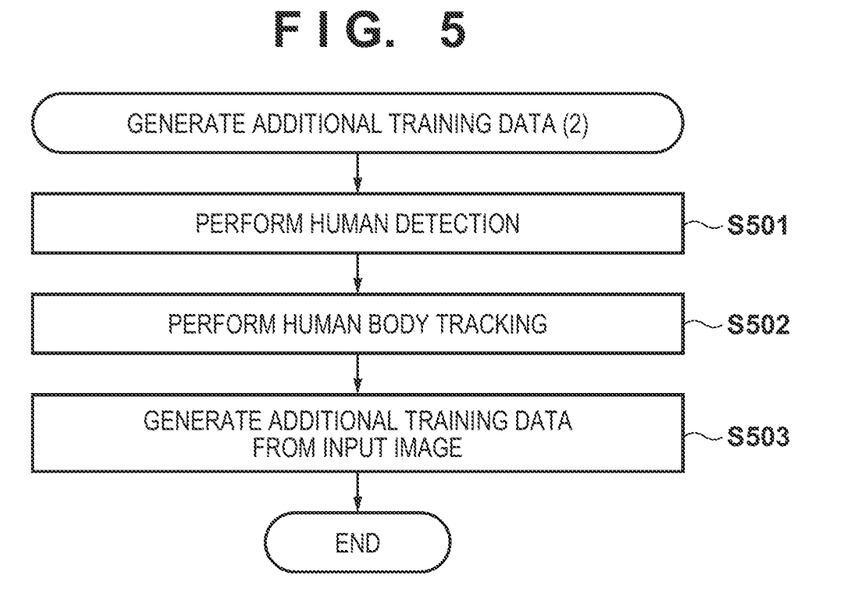
FIG. 5 is a flowchart illustrating an example of a method of generating additional training data.

Hereinafter, the processing of step S303 will be described in detail. The additional training data may be generated by multiple methods. FIG. 4 and FIG. 5 are flowcharts for illustrating an example of a method of generating the additional training data.

FIG. 4 is a flowchart for illustrating an example of generating additional training data by using a background image. In step S401, the background generation unit 202 generates a background image based on an image that the image obtaining unit 201 obtained. The background generation unit 202 may generate the background image by any method. For example, the background generation unit 202 may generate, as the background image, an average image of a plurality of images that the image obtaining unit 201 obtained. For example, the background generation unit 202 may generate, as the background image, a median value image of a plurality of images that the image obtaining unit 201 obtained. Furthermore, the background generation unit 202 may determine whether or not there is movement in images captured consecutively by using a difference between frames method or the like, and use an image that is determined to lack movement as the background image.

Figure 7A:
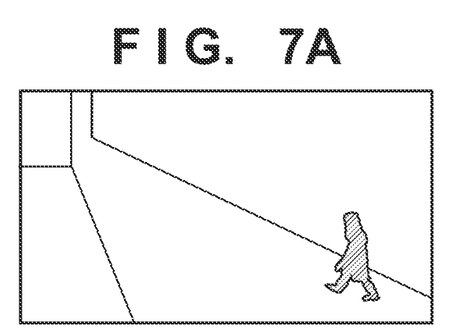
FIGS. 7A-7D are views illustrating examples of a method of generating a background image.
Figure 7B:
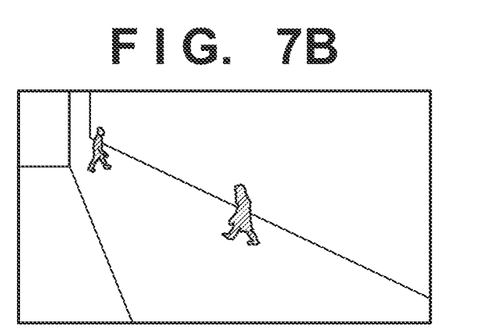
Figure 7C:
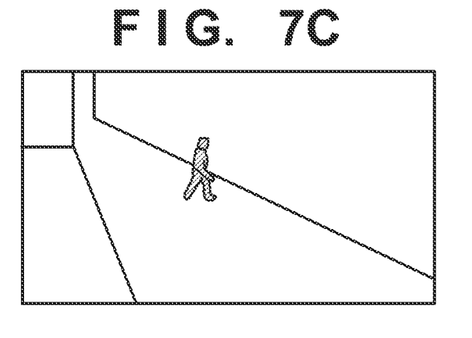
Figure 7D:
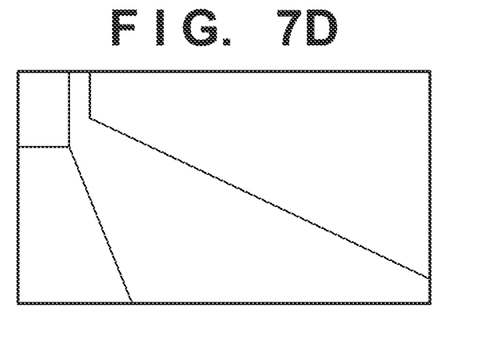

With reference to FIGS. 7A-7D, further description of the method of generating the background image will be given. FIG. 7A, FIG. 7B, and FIG. 7C illustrate images that were captured at different times by an image capturing apparatus. FIG. 7D is a median value image of these three images, and this image can be used as the background image.

Figure 8:
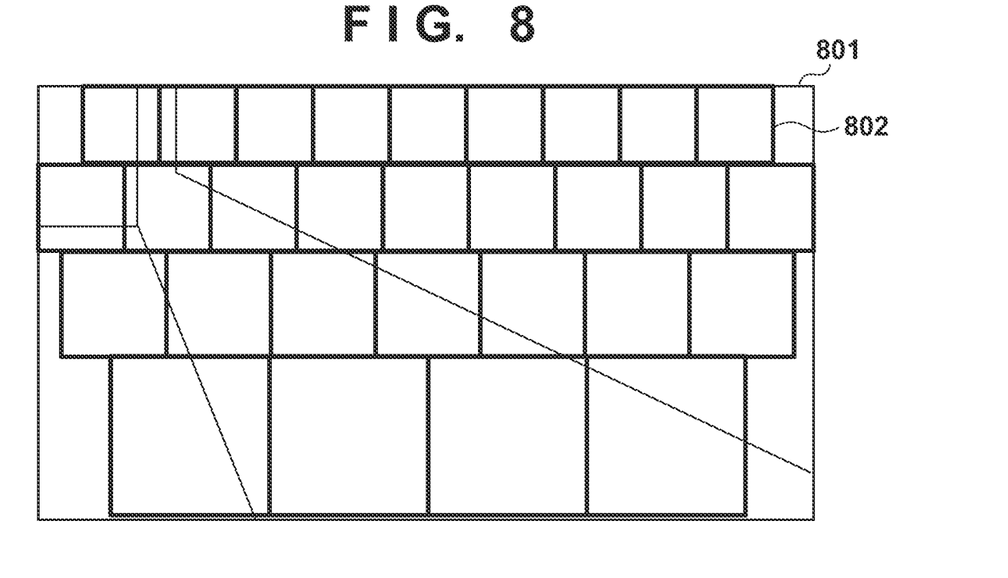
FIG. 8 is a view illustrating an example of a method for generating additional training data from a background image.

In step S402, the data generation unit 206 generates additional training data from the background image generated by the background generation unit 202. In the present embodiment, it is estimated that no human appears in the background image. The additional training data can be generated in this way. With reference to FIG. 8, a method of generating additional training data for training a regressor from the background image will now be described. An image 801 is a background image generated by the background generation unit 202. The image 801 is divided into a plurality of sub-regions as illustrated by the bold lines in FIG. 8. The image dividing process may be performed similarly to in step S308. Also, the data generation unit 206 may obtain small images by resizing sub-regions 802 that are obtained by image division to be a fixed size. It is possible to use a small image and information indicating that the number of people in the small image is 0 as the additional training data.

FIG. 5 is a flowchart for illustrating an example of generating additional training data by using human detection. In step S501, the detection unit 203 obtains a human detection result by performing human detection, targeting an image obtained by the image obtaining unit 201.

In step S502, the tracking unit 204 obtains a human tracking result by performing tracking processing by obtaining the human detection result from the detection unit 203.

In step S503, the data generation unit 206 may extract a sub-region from the image obtained by the image obtaining unit 201, and obtain a small image by resizing the sub-region into a fixed size. Also, the data generation unit 206 may obtain the numbers of people in these small images with reference to the human detection result in step S501. It is possible to use a small image and information indicating that the number of people in a small image as the additional training data. Extraction of the sub-region may be performed similarly to in step S402.

While not required, the data generation unit 206 may also determine, in step S503, a region suitable for generation of additional training data among the images that the image obtaining unit 201 obtained. Then, the data generation unit 206 generates the additional training data from the determined region. Any method may be used as the method of determination. For example, it is possible to determine a region that is suitable to generation of additional training data in accordance with the density of human presence. In other words, there is a less probability of accurate detection of the number of humans when human body detection processing is performed on a region in which humans are present at a high density, since a lot of overlapping between humans will occur. However, there is a more probability of accurate detection of the number of humans when human body detection processing is performed on a region in which humans are present at a low density. Accordingly, the training unit 207 can generate additional training data from a region in which the density of human presence is a predetermined value or lower in order to obtain more accurate additional training data.

The human presence density can be estimated using a human tracking result obtained by the tracking unit 204. For example, if a predetermined distance or more is maintained between a particular human and all other humans for a predetermined number of most recent frames, it can be considered that no other humans are present in the vicinity of that human. Accordingly, the data generation unit 206 may determine that the human presence density is low in a region in the vicinity of such a human. Also, the data generation unit 206 may determine that the human presence density is high in the other regions.

Figure 9:
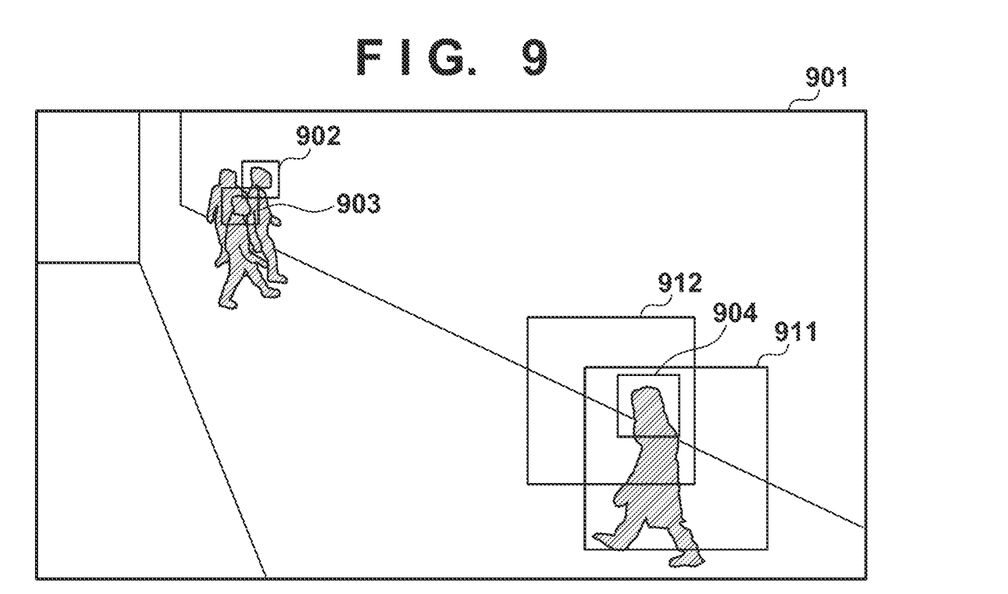
FIG. 9 is a view illustrating an example of a method for generating additional training data from a human tracking result.

In FIG. 9, an example of a method for determining a region that is suitable for additional training data generation is illustrated. Frames on an image 901 represent human tracking results 902, 903, and 904. In the example of FIG. 9, the human tracking results 902 and 903 are present within a predetermined distance of each other over a predetermined number of frames. Accordingly, the data generation unit 206 determines that the human presence density in a surrounding region of the human tracking results 902 and 903 is high. On the other hand, a human tracking result 904 is separated by the predetermined distance or more from the other human tracking results over a predetermined number of frames. Accordingly, the data generation unit 206 determines that the human presence density in a surrounding region of the human tracking result 904 is low. For example, in the case of incremental training of a regressor, the data generation unit 206 extracts a sub-region 911 and a sub-region 912 from the vicinity of the human tracking result 904, and generates additional training data by using the number of humans appearing in these sub-regions.

In the flowchart of FIG. 5, a case in which the additional training data is generated by using human tracking results is described. However, configuration may be taken for the data generation unit 206 to generate additional training data by using human detection results obtained by the detection unit 203 without performing human tracking. For example, it is possible to determine that the human presence density is low in a region in the vicinity of a human detected by the detection unit 203 if all of the other detected humans are separated from that human by a predetermined distance or more.

Also, the detection unit 203 may obtain a probability of human presence at each position in an image as human position information in the image. For example, the detection unit 203 may generate a confidence map that represents with numbers a human presence probability for each pixel of the image. In such a case, the data generation unit 206 can determine that, in a case where the sharpness of a peak at a pixel at which the presence probability is a local maximum is a predetermined value or higher in the confidence map, the human presence density is lower in the region in the vicinity of the pixel. The sharpness of a peak at a particular pixel may be defined by a ratio of a presence probability value at that pixel in relation to a sum of presence probability values in regions in a predetermined range from that pixel, for example.

Furthermore, in step S501, in place of the detection unit 203 obtaining the human detection result, the position obtaining unit 205 may obtain two-dimensional positions of humans in the image that the image obtaining unit 201 obtained by using an external apparatus. It is possible to perform the processing from step S502 by using these two-dimensional positions as the human detection result. In this example, it is assumed that only people carrying an external apparatus appear in the image used in the incremental training mode.

By virtue of the foregoing embodiments, it is possible to improve the accuracy of processing for estimating the number of people corresponding to a captured image obtained in a particular scene by constructing additional training data based on a captured image obtained in the particular scene, and performing incremental training.

In the foregoing embodiments, the training unit 207 performs incremental training of a discriminator for which training was performed in advance by using supervisory data prepared in advance, by using training data that the data generation unit 206 generates based on an image that the image obtaining unit 201 obtained. However, the training unit 207 may perform training of the discriminator from the beginning. In other words, the training unit 207 may, using a discriminator for which training has not been performed, perform training and generation of the discriminator by using both supervisory data prepared in advance and training data that the data generation unit 206 generated based on images that the image obtaining unit 201 obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-040921, filed Mar. 3, 2017, which is hereby incorporated by reference herein in its entirety.

What is claimed is:

1. An image processing apparatus, comprising:
a generation unit configured to, based on a first captured image obtained under a first image capturing condition, generate a first training data that includes a first training image and an image recognition result for the first training image; and
a training unit configured to, by performing training using the first training data, generate a discriminator for image recognition on a captured image obtained under the first image capturing condition, based on both the first training data and second training data that is prepared in advance and that includes a second training image and an image recognition result for the second training image,
wherein the second training image is generated based on a second captured image that is obtained under a second image capturing condition that is different from the first image capturing condition.

2. The image processing apparatus according to claim 1, wherein the training unit is further configured to perform training of the discriminator by using both the first training data and the second training data.

3. The image processing apparatus according to claim 1, wherein the training unit, by using the first training data, performs incremental training of the discriminator which has been trained using the second training data.

4. The image processing apparatus according to claim 3, wherein the training unit is further configured to perform the incremental training of the discriminator using mixed training data having mixture of the first training data and the second training data.

5. The image processing apparatus according to claim 4, wherein
the first training data comprises a plurality of first data items each indicating a training image and a label thereof;
the second training data comprises a plurality of second data items each indicating a training image and a label thereof;
the mixed training data comprises a plurality of data items including at least one first data item and at least one second data item; and
a sum of the number of the first data items having a particular label in the mixed training data and the number of the second data items having the particular label in the mixed training data is the same as the number of the second data items having the particular label in the second training data.

6. The image processing apparatus according to claim 1, wherein the discriminator is a discriminator for estimating a number of a counting target in an image, and the image recognition result of the first training image is the number of the counting target in the first training image, and the image recognition result of the second training image is the number of the counting target in the second training image.

7. The image processing apparatus according to claim 6, wherein the generation unit is further configured to generate the first training image from a background image of the first captured image.

8. The image processing apparatus according to claim 6, wherein the generation unit is further configured to extract the first training image from the first captured image, and to determine the number of the counting target in the first training image by using position information of the counting target in the first captured image.

9. The image processing apparatus according to claim 8, wherein the generation unit is further configured to generate position information of the counting target in the first captured image by performing detection processing of the counting target on the first captured image.

10. The image processing apparatus according to claim 8, wherein the generation unit is further configured to determine density information of the counting target for each region in the first captured image, and to extract the first training image from the first captured image in accordance with the density information for each region.

11. The image processing apparatus according to claim 1, wherein
the generation unit is further configured to repeatedly generate the first training data, and the training unit is further configured to repeatedly perform training using the first training data, and
the image processing apparatus further comprises a control unit configured to determine whether or not to end repetition of the training based on at least one of a period at which training is repeated, a repetition count for the training, or a discrimination accuracy of the discriminator for which the training has been performed.

12. The image processing apparatus according to claim 1, further comprising a recognition unit configured to perform image recognition using the discriminator generated by the training unit.

13. The image processing apparatus according to claim 1, wherein the first or second image capturing conditions include at least one of an image capturing apparatus, an image capturing time period, an image capturing position, an image capturing angle of view, an image capturing distance in relation to a ground, or an image capturing angle in relation to a ground.

14. The image processing apparatus according to claim 1, further comprising a status display unit configured to display a status of training by the training unit.

15. The image processing apparatus according to claim 14, wherein the status display unit is further configured to display at least one of an elapsed time from start of training, the number of training data items used, an estimation error according to the discriminator, or training progress, as the status of training.

16. An image processing method, comprising:
based on a first captured image obtained under a first image capturing condition, generating a first training data that includes a first training image and an image recognition result for the first training image; and
by performing training using the first training data, generating a discriminator for image recognition on a captured image obtained under the first image capturing condition, based on both the first training data and second training data that is prepared in advance and that includes a second training image and an image recognition result for the second training image,
wherein the second training image is generated based on a second captured image that is obtained under a second image capturing condition that is different from the first image capturing condition.

17. A non-transitory storage medium storing a program which, when executed by a computer comprising a processor and a memory, causes the computer to:
based on a first captured image obtained under a first image capturing condition, generating a first training data that includes a first training image and an image recognition result for the first training image; and
by performing training using the first training data, generating a discriminator for image recognition on a captured image obtained under the first image capturing condition, based on both the first training data and second training data that is prepared in advance and that includes a second training image and an image recognition result for the second training image,
wherein the second training image is generated based on a second captured image that is obtained under a second image capturing condition that is different from the first image capturing condition.

* * * * *